(12) United States Patent
Ramachandra et al.

(10) Patent No.: US 10,328,826 B2
(45) Date of Patent: Jun. 25, 2019

(54) VEHICLE SEAT, IN PARTICULAR MOTOR VEHICLE SEAT

(71) Applicant: Adient Luxembourg Holding S.à.r.l., Luxembourg (LU)

(72) Inventors: Shivaprasad Ramachandra, Leverkusen (DE); Annal Ponnarasu Ganesan, Leverkusen (DE); Peter Hudák, Margecny (SK); Bernd Hopp, Düsseldorf (DE); Helmut Jeck, Remscheid (DE); Walter Link, Langenfeld (DE); Karthikeyan M. Subramanian, Leverkusen (DE); James Abraham, Köln (DE)

(73) Assignee: ADIENT LUXEMBOURG HOLDING S.À.R.L., Luxembourg (LU)

( * ) Notice: Subject to any disclaimer, the term of this patent is extended or adjusted under 35 U.S.C. 154(b) by 0 days.

(21) Appl. No.: 15/435,919

(22) Filed: Feb. 17, 2017

(65) Prior Publication Data
US 2017/0240068 A1    Aug. 24, 2017

(30) Foreign Application Priority Data

Feb. 18, 2016    (DE) .................. 10 2016 202 513

(51) Int. Cl.
*B60N 2/10* (2006.01)
*B60N 2/16* (2006.01)
(Continued)

(52) U.S. Cl.
CPC ........... *B60N 2/1615* (2013.01); *B60N 2/206* (2013.01); *B60N 2/3011* (2013.01);
(Continued)

(58) Field of Classification Search
CPC .......... B60N 2/06; B60N 2/12; B60N 2/3011; B60N 2/1615; B64D 11/064
(Continued)

(56) References Cited

U.S. PATENT DOCUMENTS 6,955,386 B2 * 10/2005 Rhodes .................. B60N 2/062
                                                   296/65.09
7,255,384 B2 *  8/2007 Saberan ................. B60N 2/045
                                                   296/65.05
(Continued)

FOREIGN PATENT DOCUMENTS

DE          198 12 140 C1    10/1999
DE    10 2006 002 520 A1     7/2006
(Continued)

*Primary Examiner* — Shin H Kim
(74) *Attorney, Agent, or Firm* — McGlew and Tuttle, P.C.

(57) ABSTRACT

A vehicle seat (1), in particular a motor vehicle seat, includes a seat part (3), a backrest (5) and a four-bar-linkage arrangement (10), having a coupler (20), for the at least indirect coupling of the seat part (3) to a vehicle floor (S). The vehicle seat (1) is transferable from a use position suitable for transporting an individual either into a first non-use position or into a second non-use position. The seat part (3) has a seat-part frame (30), which is pivotable relative to the coupler (20), and a locking device (52), which blocks a pivoting of the seat-part frame (30) relative to the coupler (20) in a first actuating state of the locking means (52). The locking device (52) permits a pivoting of the seat-part frame (30) relative to the coupler (20) in a second actuating state of the locking device (52).

17 Claims, 4 Drawing Sheets

(51) Int. Cl.
  *B60N 2/20* (2006.01)
  *B60N 2/30* (2006.01)
  *B60N 2/36* (2006.01)
  *B60N 2/90* (2018.01)
(52) U.S. Cl.
  CPC ......... *B60N 2/3065* (2013.01); *B60N 2/3081* (2013.01); *B60N 2/36* (2013.01); *B60N 2/366* (2013.01); *B60N 2002/957* (2018.02)
(58) Field of Classification Search
  USPC ...................................................... 297/344.1
  See application file for complete search history.

(56) References Cited

U.S. PATENT DOCUMENTS

| | | | | |
|---|---|---|---|---|
| 7,306,278 | B2* | 12/2007 | Holdampf | B60N 2/20 296/65.09 |
| 7,850,220 | B2* | 12/2010 | Holdampf | B60N 2/3011 296/65.09 |
| 8,596,720 | B2* | 12/2013 | Ootsuka | B60N 2/0296 296/65.11 |
| 8,632,113 | B2* | 1/2014 | Mather | B60N 2/2356 296/65.09 |
| 9,352,695 | B1* | 5/2016 | Karosa | B60N 2/3075 |
| 9,469,349 | B1* | 10/2016 | Mather | B62D 25/24 |
| 9,725,019 | B2* | 8/2017 | Mather | B60N 2/3075 |
| 2005/0264074 | A1* | 12/2005 | Holdampf | B60N 2/20 297/344.1 |
| 2007/0210601 | A1* | 9/2007 | Phillips | B60N 2/3011 296/37.14 |
| 2008/0224524 | A1* | 9/2008 | Mather | B60N 2/3011 297/378.1 |

FOREIGN PATENT DOCUMENTS

| | | |
|---|---|---|
| DE | 10 2006 056 715 A1 | 6/2008 |
| DE | 10 2009 037 816 B3 | 10/2010 |
| DE | 10 2014 213 860 A1 | 11/2015 |
| WO | 2014/019931 A1 | 2/2014 |
| WO | 2014/019933 A1 | 2/2014 |
| WO | 2014/125055 A1 | 8/2014 |

\* cited by examiner

VEHICLE SEAT, IN PARTICULAR MOTOR VEHICLE SEAT

CROSS REFERENCE TO RELATED APPLICATIONS

This application claims the benefit of priority under 35 U.S.C. § 119 of German Application 10 2016 202 513.9 filed Feb. 18, 2016, the entire contents of which are incorporated herein by reference.

FIELD OF THE INVENTION

The invention relates to a vehicle seat, in particular a motor vehicle seat, with a seat part, a backrest and a four-bar-linkage arrangement, having a coupler, for the at least indirect coupling of the seat part to a vehicle floor, wherein the vehicle seat is transferrable from a use position suitable for transporting an individual either into a first non-use position or into a second non-use position.

BACKGROUND OF THE INVENTION

WO 2014/019931 A1 discloses a vehicle seat with a backrest and a seat part. A front region of the seat part is connectable in an articulated manner to a vehicle floor by means of a front foot. A rear region of the seat part is connectable to the vehicle floor by means of a locking device. The vehicle seat can take up a use position which is suitable for transporting an individual and in which the backrest is approximately vertical and the seat part is arranged substantially horizontally and is connected to the vehicle floor by means of the locking device. Starting from the use position, the vehicle seat can be transferred into a table position in which the backrest rests on the seat part and is substantially horizontal. After the locking device is released, the vehicle seat can be pivoted from the table position about the front foot into a non-use position in which the backrest rests on the seat part and the backrest and the seat part are arranged substantially vertically. The non-use position serves to provide additional loading space in the vehicle.

WO 2014/019931 A1 also discloses a further vehicle seat with a backrest and a seat part, wherein the seat part is connectable to the vehicle floor by means of a four-bar-linkage arrangement. The vehicle seat can take up a use position which is suitable for transporting an individual and in which the backrest is approximately vertical, wherein the seat part is arranged substantially horizontally and at a level in the vehicle suitable for transporting an individual. Starting from the use position, the vehicle seat can be transferred into a table position in which the backrest rests on the seat part and is arranged substantially horizontally. The vehicle seat can be lowered by means of the four-bar-linkage arrangement from the table position forwards and downwards into a non-use position in which the backrest rests on the seat part and the backrest and the seat part are arranged substantially horizontally.

WO 2014/125055 A1 discloses a vehicle seat with a seat part, a backrest which is pivotable about a pivot axis in relation to the seat part, at least one pair of seat rails for the longitudinal adjustment of the vehicle seat and a seat-rail locking device for locking the at least one pair of seat rails, wherein the vehicle seat can take up a use position suitable for transporting an individual and an easy-entry position in which the vehicle seat is displaced in relation to the use position by means of the at least one pair of seat rails into a front longitudinal position and the backrest is pivoted forwards about the pivot axis in order to facilitate access to a rear seat row.

SUMMARY OF THE INVENTION

The invention is based on the problem of providing a vehicle seat which can be transferred from a use position into two different non-use positions. In particular, in a first non-use position of the vehicle seat, the rear side of the backrest is intended to be usable as an extended loading platform of the vehicle. In particular, in a second non-use position of the vehicle seat, the vehicle seat is intended to protect a seat row arranged in front of said vehicle seat from a load from the loading space of the vehicle. In particular, the vehicle seat is intended to be able optionally to take up an entry position which facilitates access to a seat row arranged behind the vehicle seat. In particular, the vehicle seat is intended to be able to be extended modularly by components in order to provide an entry position.

This problem is solved according to the invention by a vehicle seat, in particular motor vehicle seat, with a seat part, a backrest and a four-bar-linkage arrangement, having a coupler, for the at least indirect coupling of the seat part to a vehicle floor, wherein the vehicle seat is transferrable from a use position suitable for transport of an individual either into a first non-use position or into a second non-use position. The seat part has a seat-part frame which is pivotable relative to the coupler, and a locking means blocks a pivoting of the seat-part frame relative to the coupler in a first actuating state of the locking means. The locking means permits a pivoting of the seat-part frame relative to the coupler in a second actuating state of the locking means.

Owing to the fact that the seat part has a seat-part frame which is pivotable relative to the coupler, and a locking means blocks a pivoting of the seat-part frame relative to the coupler in a first actuating state of the locking means, the height of the vehicle seat can be lowered by means of the four-bar-linkage arrangement. Owing to the fact that the locking means permits a pivoting of the seat-part frame relative to the coupler in a second actuating state of the locking means, the seat-part frame can be pivoted forwards in relation to the coupler of the four-bar-linkage arrangement together with the backrest, which is preferably pivoted forwards onto the seat part, and can take up a vertical arrangement.

In the first actuating state of the locking means, the vehicle seat can be transferred from the use position into the first non-use position. In the first non-use position, the backrest is preferably folded forwards onto the seat part and is lowered together with the seat part. The rear side of the backrest can serve as an extended loading platform in the first non-use position. In particular, in the first non-use position, the rear side of the backrest is at the same height as an adjoining loading platform of the vehicle. The seat part and the backrest are preferably arranged substantially horizontally in the first non-use position. In the first non-use position, the seat part is arranged further forwards and further down in comparison to its arrangement in the use position.

In the second actuating state of the locking means, the vehicle seat can be transferable from the use position into the second non-use position. In the second non-use position, the backrest is preferably folded forwards onto the seat part and folded together with the seat part into a substantially vertical arrangement. This arrangement of seat part and backrest protects a seat row arranged in front of the vehicle seat from a load from the loading space of the vehicle, in particular in the event of a frontal impact of the vehicle. In the second non-use position, the backrest is preferably pivoted forwards onto the seat part, and the seat part is pivoted relative to the coupler in comparison to its arrangement in the use position.

A locking means can be any suitable locking device/locking mechanism which is known per se, for example a catch or a bolt. The locking means is preferably a pin with a cross section which differs from a circular area and interacts with a slotted guide. The pin is preferably kinematically assigned to the seat-part frame (connected to the seat frame for movement therewith), and the slotted guide is preferably kinematically assigned to the coupler (connected to the coupler for movement therewith). However, the pin can also be kinematically assigned to the coupler and the slotted guide can be kinematically assigned to the seat-part frame.

The pin preferably has a cross sectional region that differs from a circular area region, and therefore the cross section of the pin differs in width in different directions. The pin can be mounted rotatably. The pin can be mounted rotatably about an axis of rotation running parallel to a transverse direction. The slotted guide can be an elongated hole. The slotted guide is preferably a curved elongated hole. The slotted guide advantageously has two regions of differing widths along an extent thereof, wherein the widths of the two regions are adapted to the widths of the pin in such a manner that the pin can pass through the two regions of the slotted guide only in selected angular positions.

Preferably, the pin is movable in the slotted guide in the second actuating state, and, in the first actuating state, the pin is oriented with respect to the slotted guide in such a manner that the pin cannot pass or cannot pass completely through the slotted guide. The pin can be rotatable by means of an operating element, in particular an actuating lever. The pin can be transferrable by means of an actuating lever from a first actuating state of the pin into a second actuating state of the pin and back.

The vehicle seat can have a respective pin and slotted guide on both sides of the seat, as viewed in the transverse direction. The two pins can be connected to each other. The two pins can be connected to each other by means of a rod. The two pins and/or the rod can be rotatable by means of an actuating lever. The two pins can be transferrable by means of an actuating lever from a first actuating state of the pins into a second actuating state of the pins and back.

A stop arrangement can restrict the pivoting movement of the seat-part frame relative to the coupler to a maximum pivoting angle. The stop arrangement can have a catch and a counter element interacting with the catch. The seat-part frame can be operatively connected to the catch. The seat-part frame can be operatively connected to the catch in such a manner that the pivoting of the seat-part frame relative to the coupler is restricted by contact of the catch with the counter element. The catch can be fastened to a rocker of the four-bar-linkage arrangement. The catch is preferably fastened to a front rocker of the four-bar-linkage arrangement. The counter element can be fastened to an adapter. The adapter can connect the four-bar-linkage arrangement to a vehicle floor. The counter element can be a cam.

In the first actuating state of the locking means which blocks a pivoting of the seat-part frame relative to the coupler, the vehicle seat in a simple manner can optionally take up an entry position which facilitates access to a seat row arranged behind the vehicle seat. Apart from the two non-use positions, a vehicle seat according to the invention can therefore optionally also take up an entry position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, a vehicle seat 1 is described below in a Cartesian coordinate system which is defined by three spatial directions that are perpendicular to one another. When a vehicle seat 1 is installed in the vehicle, a longitudinal direction x runs substantially horizontally and preferably parallel to a longitudinal direction of the vehicle, which corresponds to the usual direction of travel of the vehicle. A transverse direction running perpendicularly to the longitudinal direction x is likewise oriented horizontally in the vehicle and runs parallel to a transverse direction of the vehicle. A vertical direction z runs perpendicularly to the longitudinal direction x and perpendicularly to the transverse direction. A vertical arrangement should be understood as meaning an arrangement which runs parallel to the vertical direction z. When a vehicle seat 1 is installed in the vehicle, the vertical direction z runs parallel to the vertical axis of the vehicle.

The position and direction specifications used, for example front, rear, top and bottom, relate to a viewing direction of an occupant of the vehicle seat 1 in a normal sitting position, wherein the vehicle seat 1 is oriented as usual in the direction of travel. However, the vehicle seat 1 according to the invention can also be installed in some other orientation, for example transversely with respect to the direction of travel.

Figure 1:
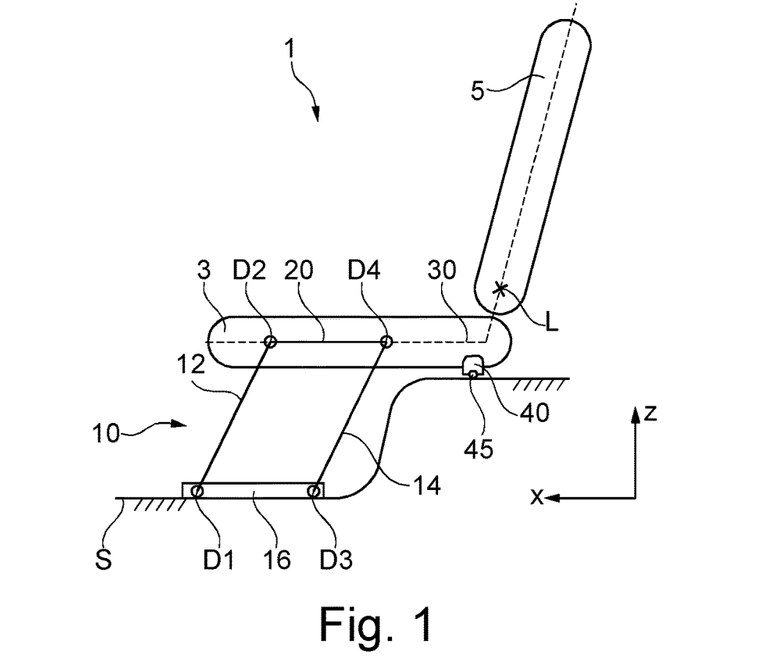
FIG. 1 is a schematic side view of a vehicle seat according to the invention in a use position suitable for transporting an individual.

FIG. 1 shows the vehicle seat 1 in a use position suitable for transporting an individual. The vehicle seat 1 is designed in particular for a middle seat row of a motor vehicle, for example a van. In the use position, the backrest 5 is slightly inclined to the rear in relation to the vertical direction z and the seat part 3 is oriented substantially horizontally.

The vehicle seat 1 is constructed substantially symmetrically with respect to a central plane running perpendicularly to the transverse direction. Unless described differently, only one seat side of the substantially symmetrical vehicle seat 1 is described below, specifically first of all in the use position illustrated in FIG. 1. The vehicle seat 1 has a seat part 3 and a backrest 5. The backrest 5 is connected on both sides, as viewed in the transverse direction, to the seat part 3 by means of at least one lockable fitting in each case so as to be pivotable about a backrest pivot axis L. By means of the fittings, the backrest 5 can be locked in the position which is slightly inclined to the rear in relation to the vertical direction z, and, in the released state, can be pivoted forwards about the backrest pivot axis L onto the seat part 3. In a modification of the exemplary embodiment, the fittings can additionally permit an adjustment of the inclination of the backrest 5, and therefore a plurality of use positions in which an occupant can sit in the vehicle seat 1 are possible. A use position arranged between a steepest and a flattest use position is referred to as the design position in which the backrest 5 is inclined to the rear by, for example, 22° in relation to the vertical.

The vehicle seat 1 is connectable to a vehicle floor S of the motor vehicle by means of a four-bar-linkage arrangement 10. The four-bar-linkage arrangement 10 has a front rocker 12, a rear rocker 14, an adapter 16 and a coupler 20. The adapter 16 is connectable to the vehicle floor S.

In the use position, the coupler 20 runs substantially parallel to the longitudinal direction x. The coupler 20 is connected to the adapter 16 in an articulated manner by means of the front rocker 12 and the rear rocker 14. The front rocker 12 is provided at both ends with a respective joint, of which a first joint forms a coupling, which is rotatable about a first axis of rotation D1, of the front rocker 12 to the adapter 16, and a second joint forms a coupling, which is rotatable about a second axis of rotation D2, of the front rocker 12 to the front end of the coupler 20. By means of the rear rocker 14, the coupler 20 and therefore the seat part 3 are connected in a region lying behind the front rocker 12 to the adapter 16 and the coupler 20 in an articulated manner by said rear rocker 14 being provided at both ends with joints, of which a third joint forms a coupling, which is rotatable about a third axis of rotation D3, of the rear rocker 14 to the adapter 16, and a fourth joint forms a coupling, which is rotatable about a fourth axis of rotation D4, to the rear end of the coupler 20.

The joints defining the four axes of rotation D1, D2, D3 and D4 form a four-bar-linkage arrangement 10, the four mechanism members of which are the adapter 16, the two rockers 12, 14 and the coupler 20. The two rockers 12, 14 take up an approximately parallel position to each other here, but, in a modification of the exemplary embodiment, can also take up orientations differing from the parallelism.

A front region of a seat-part frame 30 is coupled to the coupler 20 so as to be rotatable about the second axis of rotation D2. A rear region of the seat-part frame 30 is connectable releasably to the vehicle floor S by means of a locking device 40. For this purpose, a curved locking member 45 is fastened to the vehicle floor S. The vehicle floor S has a step in such a manner that the curved locking member 45 is arranged higher than that region of the vehicle floor S which serves for the connection of the adapter 16. The locking device 40 can lock the four-bar-linkage arrangement 10 via the seat-part frame 30.

The seat-part frame 30 serves for receiving a cushion of the seat part 3. The backrest 5 is connected to the seat-part frame 30 of the seat part 3 by means of the fittings.

Figure 2:
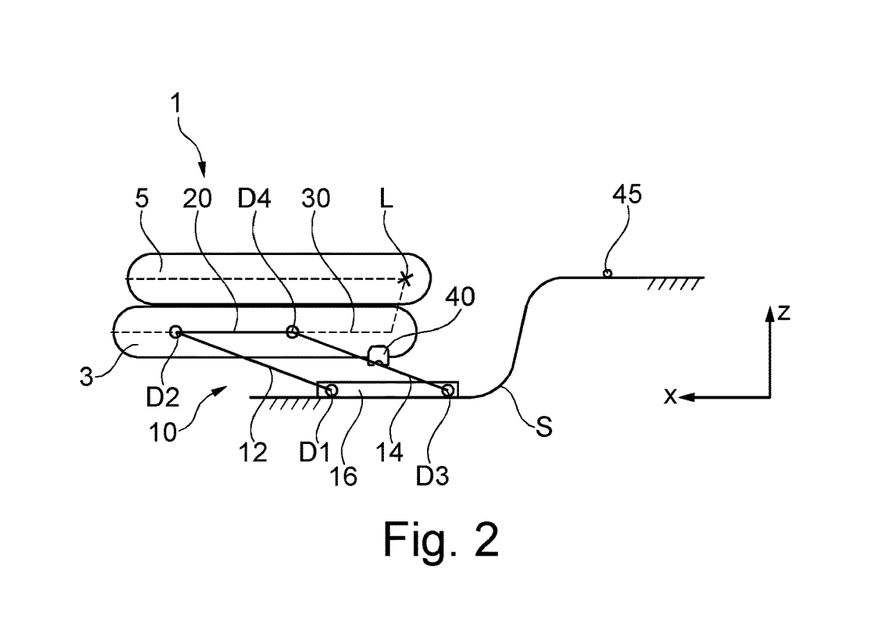
FIG. 2 is a schematic side view of the vehicle seat from FIG. 1 in a first non-use position.

FIG. 2 shows the vehicle seat 1 in a first non-use position. In the first non-use position, the seat part 3 is lowered forwards and downwards and the backrest 5 rests on the seat part 3. Seat part 3 and backrest 5 are arranged substantially horizontally, that is to say parallel to the longitudinal direction x. The first non-use position serves in particular to extend a luggage compartment volume of the motor vehicle.

During the transition from the use position into the first non-use position, the vehicle seat 1 can first of all be transferred into a table position in which the backrest 5 is pivoted forwards about the backrest pivot axis L and rests substantially horizontally on the seat part 3. The vehicle seat 1 can subsequently be lowered from the table position forwards and downwards into the first non-use position by means of the four-bar-linkage arrangement 10. The transition from the use position into the first non-use position can take place continuously beyond the table position. Alternatively, for the transition from the use position into the first non-use position, the vehicle seat 1 can first of all be lowered from the use position by means of the four-bar-linkage arrangement 10 and then the backrest 5 can be pivoted forwards onto the seat part 3 about the backrest pivot axis L.

Figure 3:
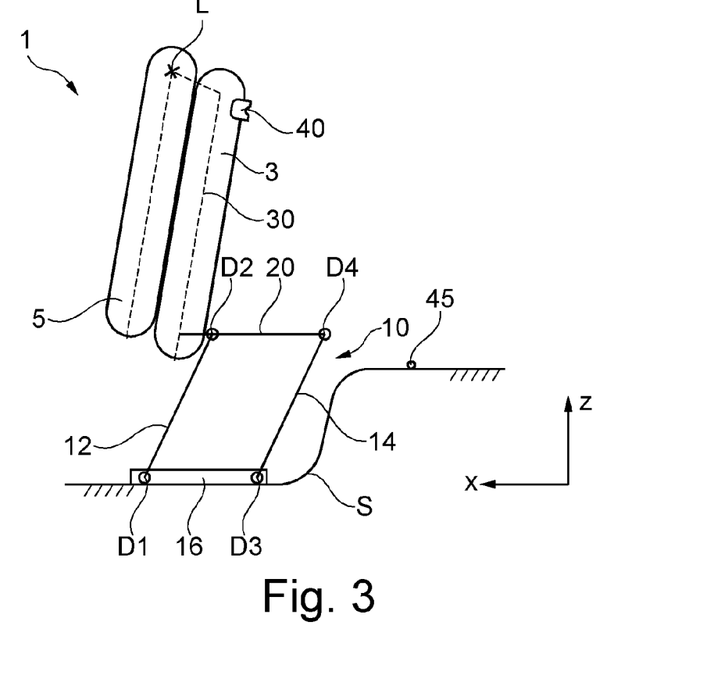
FIG. 3 is a schematic side view of the vehicle seat from FIG. 1 in a second non-use position.

FIG. 3 shows the vehicle seat 1 in a second non-use position. In the second non-use position, the backrest 5 is pivoted forwards about the backrest pivot axis L onto the seat part 3 and is pivoted forwards together with the seat part 3 about the second axis of rotation D2. Backrest 5 and seat part 3 are arranged substantially parallel to the vertical direction z. The second non-use position serves in particular to extend a luggage compartment volume of the motor vehicle and at the same time to protect a front seat row from pieces of luggage. In the second non-use position, the four-bar-linkage arrangement 10 is arranged unchanged in comparison to the use position. The seat-part frame 30 is pivoted forwards about the second axis of rotation D2 relative to the coupler 20 of the four-bar-linkage arrangement 10.

Figure 4:
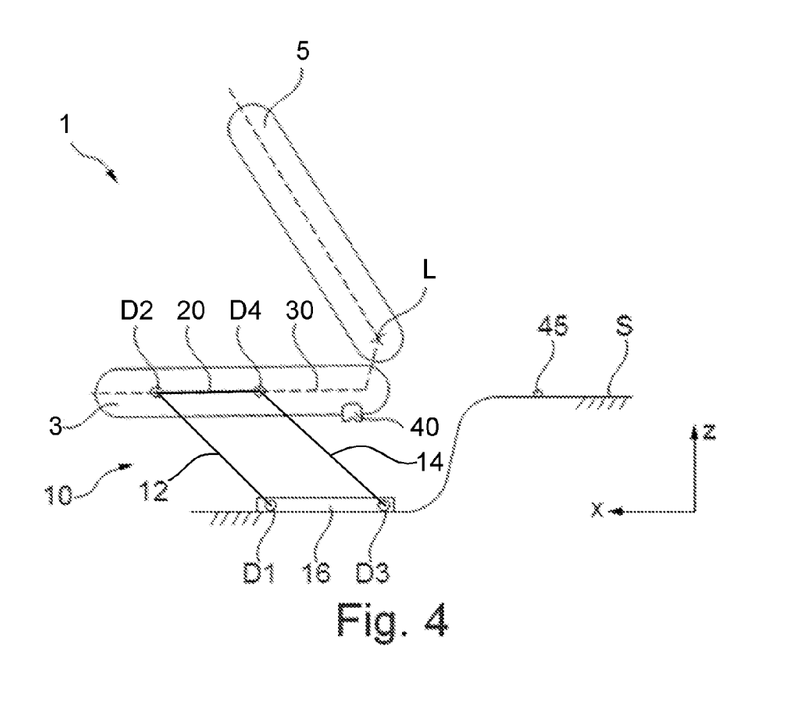
FIG. 4 is a schematic side view of the vehicle seat from FIG. 1 in an entry position.

FIG. 4 shows an entry position which facilitates the access to a third seat row arranged behind the vehicle seat 1. The backrest 5 is pivoted forwards preferably by 20° to 45° about the backrest pivot axis L in the entry position and locked. The backrest 5 can be locked in this position in a form-fitting manner, for example by means of a catch, or in a force-fitting manner, for example by means of a spring element. In the entry position, the seat part 3 is only partially pivoted forwards and downwards by means of the four-bar-linkage arrangement 10. Therefore, the seat part 3 is further forwards in the entry position than in the use position, but is further rearwards than in the first non-use position. The seat part 3 is further down in the entry position than in the use position, but further up than in the first non-use position. The four-bar-linkage arrangement 10 can be locked in this position in a form-fitting manner, for example by means of a catch, or in a force-fitting manner, for example by means of a spring element. The entry position can be dispensed with in particular if the motor vehicle does not have a third seat row.

Figure 5:
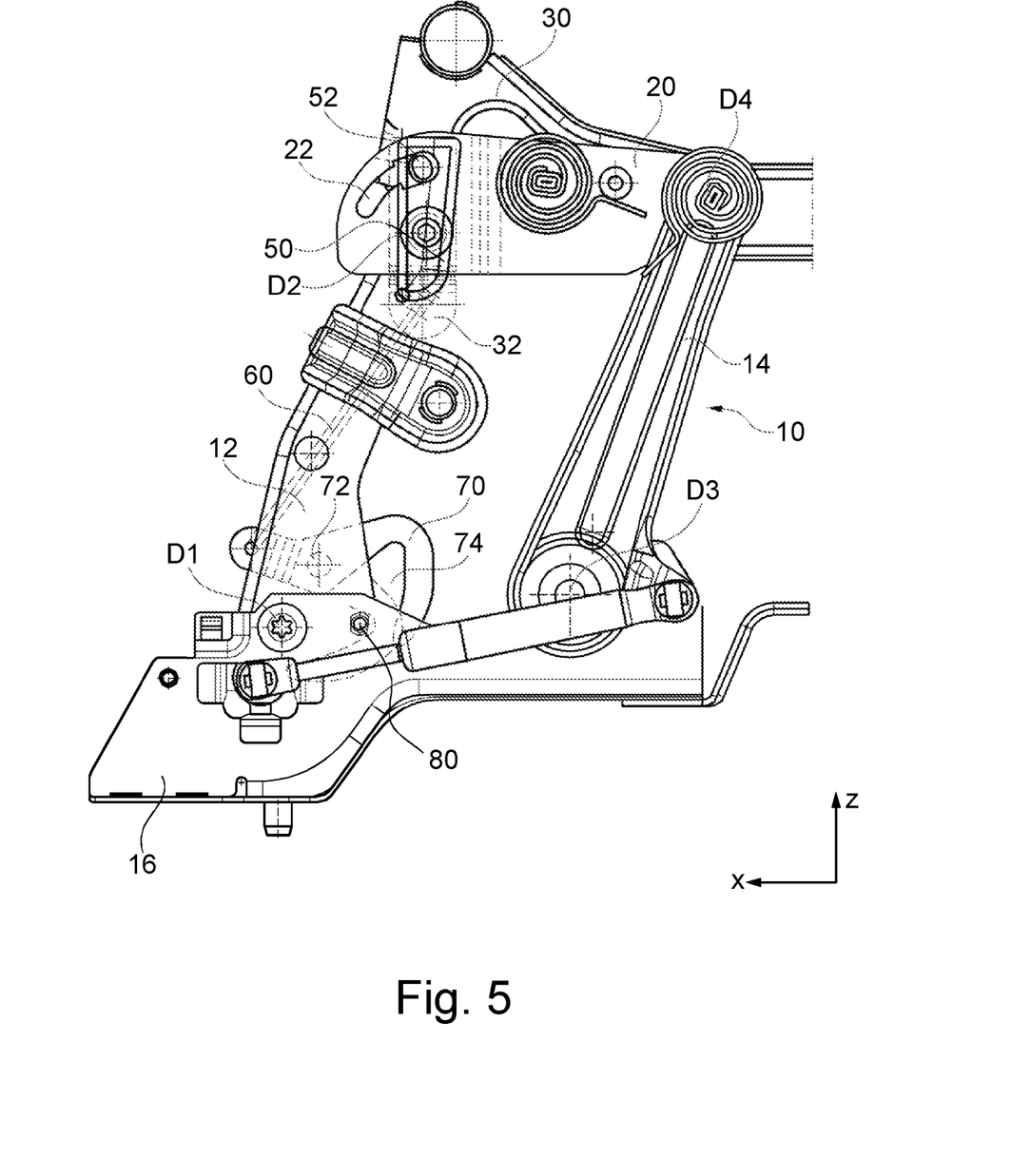
FIG. 5 is a side view of a four-bar-linkage arrangement of the vehicle seat from FIG. 1, wherein a locking means is oriented in such a manner that the vehicle seat is transferrable into the first non-use position.
Figure 6:
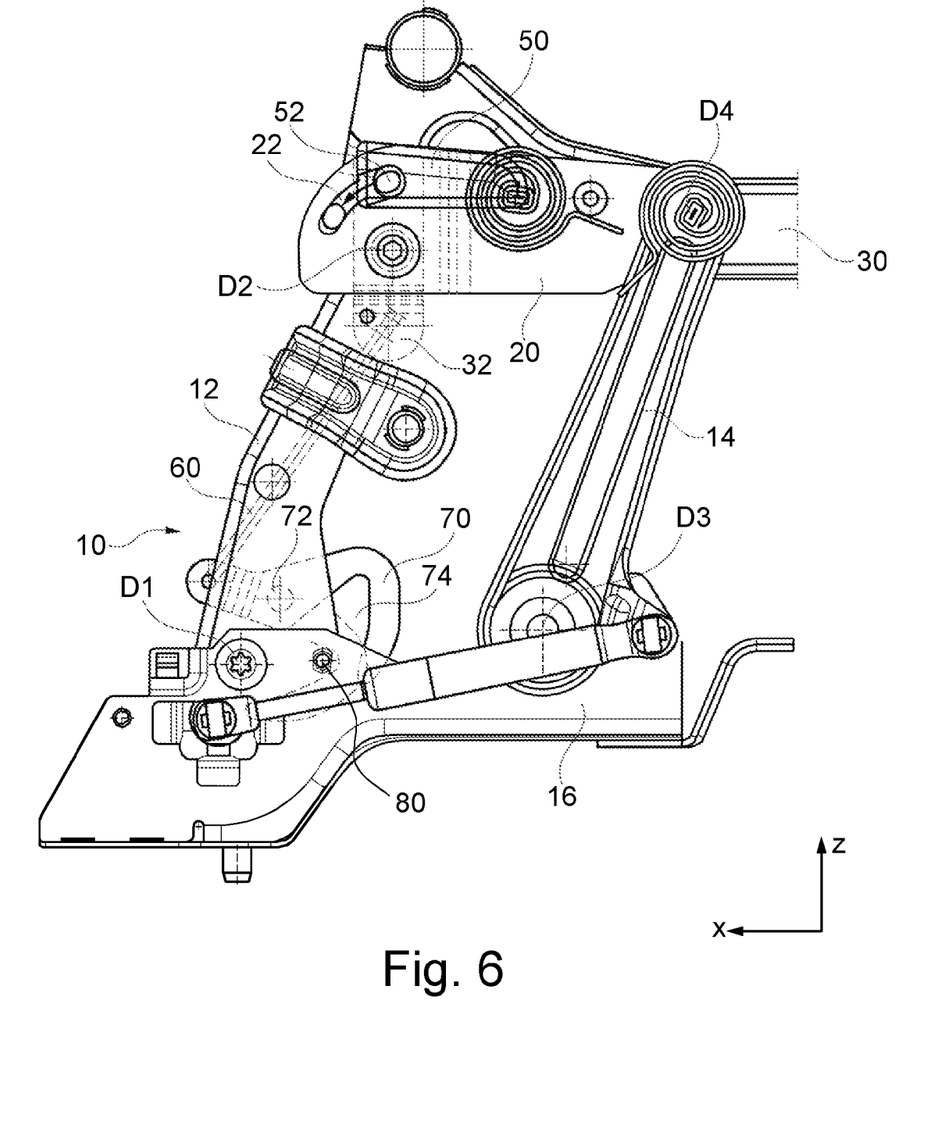
FIG. 6 is a side view corresponding to FIG. 5, wherein the locking means blocks a transition into the first non-use position.

FIGS. 5 and 6 show the vehicle seat 1 in the region of the four-bar-linkage arrangement 10 in detail. A locking means configured as a pin 52 blocks a pivoting of the seat-part frame 30 relative to the coupler 20 in a first actuating state of the pin 52 (FIG. 5). The pin 52 permits a pivoting of the seat-part frame 30 relative to the coupler 20 in a second actuating state of the pin 52 (FIG. 6).

On both sides of the vehicle seat 1, a respective pin 52 running in the transverse direction is arranged rotatably relative to the seat-part frame 30. The two pins 52 are connected to each other preferably by means of a rod running in the transverse direction. The rod synchronizes the angular position of the two pins 52 with respect to each other. An actuating lever 50 is connected to one of the two pins 52 and/or to the rod for rotation therewith. By actuation of the actuating lever 50, the two pins 52 can therefore be rotated, preferably about a rod central axis running in the transverse direction.

The pins 52 are arranged eccentrically with respect to the second axis of rotation D2. The pins 52 have a cross section differing from a circular area, an elliptical cross section here. The largest diameter of each pin 52 lies in the direction of a main axis of its elliptical cross section. The smallest diameter of each pin 52 lies in the direction of a secondary axis of its elliptical cross section, which secondary axis is arranged perpendicularly to the main axis.

On both sides of the seat, a respective pin 52 engages in a slotted guide 22 of the respective coupler 20. The slotted guide 22 is curved about the second axis of rotation D2. At an end facing the fourth axis of rotation D4, the slotted guide 22 has a larger width (as viewed in the radial direction with respect to the second axis of rotation D2) than over the further course of the slotted guide 22, said course running in a manner facing away from the fourth axis of rotation D4. In the use position illustrated in FIGS. 5 and 6, the pins 52 are each located in the region of greater width. The region of the greater width of the slotted guide 22 is only slightly larger than the main axis of the elliptical cross section of the pins 52. The remaining course of the slotted guide 22 is narrower than the main axis of the elliptical cross section of the associated pin 52, but is slightly larger than the secondary axis of the elliptical cross section of the assigned pin 52. As a result, the pins 52 can only move completely through the assigned slotted guides 22 when the main axes of the elliptical cross section run at least approximately tangentially to a circle about the second axis of rotation D2.

In the illustration of FIG. 5, the actuating lever 50 and therefore the pins 52 are in an angular position in which the main axes of the cross sections of the pins 52 run approximately in the radial direction about the second axis of rotation D2. For this reason, the pins 52 cannot pass through the assigned slotted guides 22, and therefore a rotation of the seat-part frame 30 relative to the coupler 20 is blocked. A transition from the use position into the second non-use position is therefore also blocked.

In the illustration of FIG. 6, the actuating lever 50 and therefore the pins 52 are in an angular position in which the main axes of the cross sections of the pins 52 run approximately tangentially about the second axis of rotation D2. For this reason, the pins 52 can pass through the assigned slotted guides 22, and therefore a rotation of the seat-part frame 30 relative to the coupler 20 is possible. Therefore, a transition from the use position into the second non-use position is also possible.

The seat-part frame 30 is coupled in its front region by means of a supporting arm 32 to the coupler 20 so as to be rotatable about the second axis of rotation D2. A first end of a coupling rod 60 is coupled to the supporting arm 32 eccentrically with respect to the second axis of rotation D2. A second end of the coupling rod 60 is coupled to a catch 70. The coupling rod 60 runs substantially parallel to the front rocker 12. The catch 70 is mounted rotatably on a lower region of the front rocker 12 by means of a rotary bearing. The catch 70 has a catch mouth 74. The rotary bearing 72 is arranged between the coupling point of the coupling rod 60 to the catch 70 and the catch mouth 74. A counter element 80, for example a bolt, is arranged on the adapter 16. The first axis of rotation D1, the rotary bearing 72 and the counter element 80 form the corner points of a triangle, preferably of an isosceles triangle.

A rotation of the seat-part frame 30 relative to the coupler 20 brings about, via the coupling rod 60, a rotation of the catch 70. If the seat-part frame 30 is pivoted into an angular position corresponding to the second non-use position, the catch mouth 74 comes into contact with the counter element 80. As a result, further pivoting of the seat-part frame 30 and therefore of the seat part 3 relative to the coupler 20 is blocked.

The features disclosed in the above description, the claims and the drawings can be important both individually and in combination in order to realize the invention in its various configurations.

Although the invention has been described in detail in the drawings and in the illustration above, the illustrations should be understood as being illustrative and exemplary, and not as restrictive. In particular, the selection of the proportions of the individual elements illustrated in the drawings should not be interpreted as being necessary or restrictive. Furthermore, the invention is in particular not restricted to the exemplary embodiments discussed. Further variants of the invention and their embodiment will be apparent to a person skilled in the art from the above disclosure, from the figures and from the claims.

While specific embodiments of the invention have been shown and described in detail to illustrate the application of the principles of the invention, it will be understood that the invention may be embodied otherwise without departing from such principles.

What is claimed is:

1. A vehicle seat comprising:
   a seat part;
   a backrest; and
   a four-bar-linkage arrangement having a front rocker, a rear rocker, a coupler and an adapter for an at least indirect coupling of the seat part to a vehicle floor, wherein:
   the coupler is connected to the adapter by the front rocker and the rear rocker;
   the vehicle seat is transferrable from a use position suitable for transport of an individual either into a first non-use position or into a second non-use position; and
   the seat part comprises a seat-part frame for receiving a cushion of the seat part, the seat-part frame being coupled to the coupler such that the seat-part frame is pivotable relative to the coupler and a locking means for blocking a pivoting of the seat-part frame relative to the coupler in a first actuating state of the locking means and for permitting a pivoting of the seat-part frame relative to the coupler in a second actuating state of the locking means, wherein the vehicle seat can take up an entry position, wherein the entry position facilitates access to a seat row arranged behind the vehicle seat.

2. A vehicle seat according to claim 1, wherein in the first actuating state of the locking means, the vehicle seat is transferrable from the use position into the first non-use position.

3. A vehicle seat according to claim 1, wherein in the second actuating state of the locking means, the vehicle seat is transferrable from the use position into the second non-use position.

4. A vehicle seat according to claim 1, wherein in the first non-use position, the backrest is pivoted forwards onto the seat part, and the seat part and the backrest are arranged horizontally.

5. A vehicle seat according to claim 4, wherein in the first non-use position, the seat part is arranged further forwards and further down in comparison to an arrangement in the use position.

6. A vehicle seat according to claim 1, wherein in the second non-use position, the backrest is pivoted forwards onto the seat part and the seat part is pivoted relative to the coupler, into a vertical orientation, in comparison to an arrangement in the use position.

7. A vehicle seat according to claim 1, wherein:
the locking means comprises a slotted guide and a pin with a cross section differing from a circular area;
in the second actuating state, the pin is movable in the slotted guide; and
in the first actuating state, the pin is oriented with respect to the slotted guide such that the pin cannot pass or cannot pass completely through the slotted guide.

8. A vehicle seat according to claim 7, wherein the pin is kinematically assigned to the seat-part frame, and the slotted guide is kinematically assigned to the coupler.

9. A vehicle seat according to claim 1, wherein the seat-part frame is operatively connected to a catch such that the pivoting of the seat-part frame relative to the coupler is restricted by contact of the catch with a counter element.

10. A vehicle seat according to claim 8, wherein one end of the front rocker is connected to the coupler to define a front rocker coupler connection area, the slotted guide being located adjacent to the front rocker coupler connection area.

11. A vehicle seat according to claim 3, wherein one end portion of the seat part is pivotably connected to one end portion of the coupler and another end portion of the seat part is detached from the coupler when the vehicle seat is in the second non-use position, wherein the another end portion of the seat part is located at a spaced location from another end portion of the coupler when the vehicle seat is in the second non-use position.

12. A vehicle seat comprising:
a seat part;
a backrest; and
a four-bar-linkage arrangement having a front rocker, a rear rocker, a coupler and an adapter for an at least indirect coupling of the seat part to a vehicle floor, wherein:
the coupler is connected to the adapter via the front rocker and the rear rocker;
the coupler extends from at least one end of the front rocker to one end of the rear rocker;
the vehicle seat is transferrable from a use position suitable for transport of an individual either into a first non-use position or into a second non-use position; and
the seat part comprises a seat-part frame for receiving a cushion of the seat part, the seat-part frame being coupled to the coupler such that the seat-part frame is pivotable relative to the coupler and a locking means for blocking a pivoting of the seat-part frame relative to the coupler in a first actuating state of the locking means and for permitting a pivoting of the seat-part frame relative to the coupler in a second actuating state of the locking means, wherein in the second actuating state of the locking means, the vehicle seat is transferrable from the use position into the second non-use position, one end portion of the seat part being pivotably connected to one end portion of the coupler and another end portion of the seat part being detached from the coupler when the vehicle seat is in the second non-use position, the another end portion of the seat part being located at a spaced location from another end portion of the coupler when the vehicle seat is in the second non-use position.

13. A vehicle seat according to claim 12, wherein:
the locking means comprises a slotted guide and a pin with a cross section differing from a circular area;
in the second actuating state, the pin is movable in the slotted guide; and
in the first actuating state, the pin is oriented with respect to the slotted guide such that the pin cannot pass or cannot pass completely through the slotted guide.

14. A vehicle seat according to claim 13, wherein the pin is kinematically assigned to the seat-part frame, and the slotted guide is kinematically assigned to the coupler.

15. A vehicle seat according to claim 14, wherein one end of the front rocker is connected to the coupler to define a front rocker coupler connection area, the slotted guide being located adjacent to the front rocker coupler connection area.

16. A vehicle seat comprising:
a seat part;
a backrest; and
a four-bar-linkage arrangement having a front rocker, a rear rocker, a coupler and an adapter for an at least indirect coupling of the seat part to a vehicle floor, wherein:
the coupler is connected to the adapter via the front rocker and the rear rocker;
one end of the front rocker is connected to a first area of the coupler;
one end of the rear rocker is connected to a second area of the coupler;
the first area of the coupler is located at a spaced location from the second area;
the vehicle seat is transferrable from a use position suitable for transport of an individual either into a first non-use position or into a second non-use position; and
the seat part comprises a seat-part frame for receiving a cushion of the seat part, the seat-part frame being coupled to the coupler such that the seat-part frame is pivotable relative to the coupler and a locking means for blocking a pivoting of the seat-part frame relative to the coupler in a first actuating state of the locking means and for permitting a pivoting of the seat-part frame relative to the coupler in a second actuating state of the locking means.

17. A vehicle seat according to claim 16, wherein the coupler extends from at least the one end of the front rocker to the one end of the rear rocker.

* * * * *